UNITED STATES PATENT OFFICE.

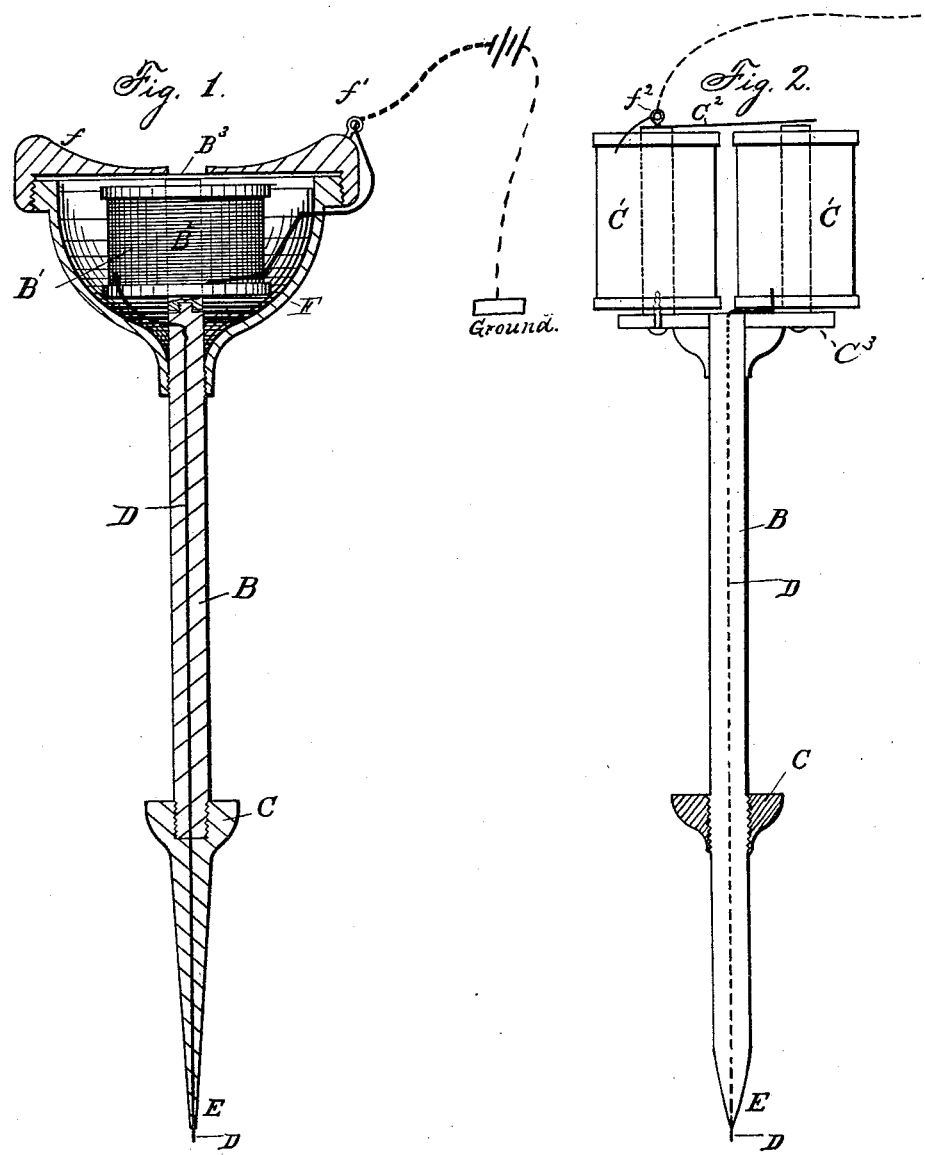

LEWIS MANN, OF DETROIT, MICHIGAN.

IMPLEMENT FOR CLOSING AND TESTING ELECTRIC CIRCUITS.

SPECIFICATION forming part of Letters Patent No. 266,854, dated October 31, 1882.

Application filed February 13, 1882. (No model.)

*To all whom it may concern:*

Be it known that I, LEWIS MANN, of Detroit, county of Wayne, State of Michigan, have invented a new and useful Improvement in Circuit Closing and Testing Implements; and I declare the following to be a full, clear, and exact description of the same, such as will enable others skilled in the art to which it pertains to make and use it, reference being had to the accompanying drawings, which form a part of this specification.

This invention relates to an implement especially designed for closing circuits to ground through a battery from the several terminals of a telephone switch-board, described and illustrated in an application for Letters Patent filed by me February 28, 1882, and numbered 53,958, though it may be used for connecting a terminal of any open circuit with another terminal and testing as to whether or not the circuit thus closed is intact.

The invention consists in a hand implement having a novel construction, which will be hereinafter fully described with reference to the accompanying drawings, in which—

Figure 1 is a longitudinal section of an implement constructed according to my invention, and Fig. 2 illustrates a modification thereof.

The letter B indicates a stem or handle formed of non-conducting material, and preferably provided with a swell, C, to facilitate handling, and with a tapering point, as shown at E. Through the center of the stem, and projecting slightly from its point, is arranged an electrical conductor, D, having its end opposite its projecting tip connected with one terminal of the helix $b'$ of an electro-magnet, the core $B^2$ of which is secured to the stem at one end, while the other end of said core stands adjacent to a diaphragm, $B^3$, which is supported by a casing, F, inclosing the helix and secured to the stem, said casing having an ear-piece, $f$, constructed and arranged with respect to the diaphragm similarly to the ear-piece of a telephonic receiver. The terminal of the helix $B'$ opposite that which is connected with the conductor D is connected to a metal post, $f'$, projecting from the ear-piece.

When the implement is to be used for connecting line or other circuit terminals to ground, as in my application before referred to, the post $f'$ will be connected to one pole of a battery, the other pole of which is connected to ground, as shown in dotted lines. It will now be seen that, if the projecting tip of the conductor D be placed in contact with a terminal of a conductor or line of conductors the other end of which is grounded or connected with the pole of the battery opposite that connected with post $f'$, a current from the battery will flow over said conductor or line, the conductor D, and helix $B'$, if the circuit be complete, and the core $B^2$ of the helix will attract the diaphragm $B^3$, causing it to produce a sound by its sudden movement, and by making and breaking the contact between conductor D and the line-terminal the sounds at the diaphragm may be repeated as often as desired, and can be heard by the operator having his ear applied to the ear-piece. Thus while grounding a line through his battery the operator may readily ascertain if the circuit be complete.

I do not limit myself to any particular kind of signaling device to be operated by a magnet connected with the conductor D and a battery, and in Fig. 2 I show an implement using a visual instead of an audible signal.

The letters $C'C'$ indicate the coils of an electro-magnet, the cores of which are connected by a yoke, $C^3$, which is secured to the end of stem or handle B. To the pole of one of the cores is attached one end of a spring-armature, $C^2$, the other end of which normally stands at a little distance from the other pole, but will be attracted thereby when the magnet is energized by a current traversing its coils. One of the coil-terminals of the magnet is connected with the conductor D and the other with a post, $c$, which may be connected with a battery, as already explained. By observing the armature the operator may know whether or not the circuit is complete.

Instead of connecting the implement permanently with a battery, it may be connected with a line-terminal and its conductor-point applied to the terminal of another line which includes a battery; and if the circuit is complete the magnet will operate the signal.

What I claim is—

1. A circuit closing and testing implement consisting of a non-conducting handle having an electric conductor arranged therein and projecting therefrom, an electro-magnet mounted on said handle, and having one of its coil-terminals connected with said conductor and the other arranged for connection with an exterior conductor, and a signaling device arranged to be operated by the magnet, substantially as described.

2. The combination, with the stem or handle B, having the swell C, of the conductor D, arranged in said stem or handle, and projecting from one end thereof, an electro-magnet mounted on said stem or handle, and having one of its coil-terminals connected with said conductor and its other terminal arranged for connection with a battery, and a signaling device forming a part of the implement and arranged to be operated by the said magnet, substantially as described.

In testimony whereof I sign this specification in the presence of two witnesses.

LEWIS MANN.

Witnesses:
J. EDWARD WARREN,
CHARLES MANN.